United States Patent
Hosono

(10) Patent No.: US 8,620,303 B2
(45) Date of Patent: Dec. 31, 2013

(54) RADIO BASE STATION AND NETWORK DEVICE

(75) Inventor: Hiroyuki Hosono, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 196 days.

(21) Appl. No.: 13/122,290

(22) PCT Filed: Oct. 1, 2009

(86) PCT No.: PCT/JP2009/067185
§ 371 (c)(1),
(2), (4) Date: Jun. 17, 2011

(87) PCT Pub. No.: WO2010/038839
PCT Pub. Date: Apr. 8, 2010

(65) Prior Publication Data
US 2011/0237286 A1 Sep. 29, 2011

(30) Foreign Application Priority Data
Oct. 2, 2008 (JP) ................................. 2008-257812

(51) Int. Cl.
H04W 4/00 (2009.01)
(52) U.S. Cl.
USPC .......................................... 455/423; 455/515
(58) Field of Classification Search
USPC .................. 455/515, 423, 434, 436, 507, 522; 370/331, 335
See application file for complete search history.

(56) References Cited

U.S. PATENT DOCUMENTS

| 2007/0173259 A1 | 7/2007 | Akihara | |
| 2009/0042593 A1* | 2/2009 | Yavuz et al. | 455/522 |
| 2009/0047945 A1* | 2/2009 | Zhang et al. | 455/424 |

FOREIGN PATENT DOCUMENTS

| CN | 1462515 A | 12/2003 |
| JP | 2006 135673 | 5/2006 |
| WO | 2005 125249 | 12/2005 |

OTHER PUBLICATIONS

Japanese Office Action issued Oct. 2, 2012 in Patent Application No. 2010-531909 with English Translation.
3GPP TSG RAN WG3 Meeting #57, R3-071466, "Self-Configuration Considerations of Home NodeB", Huawei, Total 3 Pages, (Aug. 20-24, 2007).
3GPP TSG RAN WG3 Meeting #58, R3-072089, "Neighbour Cell Signal Detection Functionality for 3G HNB", Huawei, Total 2 Pages, (Nov. 5-9, 2007).

(Continued)

Primary Examiner — Sam Bhattacharya
(74) Attorney, Agent, or Firm — Oblon, Spivak, McClelland, Maier & Neustadt, L.L.P.

(57) ABSTRACT

A radio base station 200 according to the present invention includes a common control signal reception unit 11 to receive a common control signal transmitted from each neighboring cell, a measurement unit 12 to measure a reception level of the received common control signal, a recognition unit 13 to recognize a transmission level of the common control signal at the neighboring cell and a type of the neighboring cell based on the received common control signal, a transmission level determination unit 14 to determine a transmission level of a common control signal based on the reception level of the common control signal, the transmission level of the common control signal at the neighboring cell and the type of the neighboring cell and a common control signal transmission unit 15 to transmit the common control signal at the transmission level determined by the transmission level determination unit.

15 Claims, 10 Drawing Sheets

(56) References Cited

OTHER PUBLICATIONS

Hayashi, T. et al., "A Study of Transmission Power Allocation in Downlink Common Control Channels in W-CDMA System", NTT Mobile Communications Network Inc., p. 466, (2000) (with English translation).

Mori, S. et al., "Field Experiments for Service Area Evaluation in W-CDMA With Receiving Quality Measurement Systems", NTT Docomo, Inc., p. 432, (2001) (with English translation).

3GPP TSG RAN #35, RP-070209, "Requirements for LTE Home ENodeBs", Orange, Telecom Italia, T-Moble, Vodafone, (Mar. 6-9, 2007).

International Search Report Issued Oct. 27, 2009 in PCT/JP09/067185 filed Oct. 1, 2009.

Office Action issued May 6, 2013, in Chinese patent Application No. 200980139153.1 with English translation.

\* cited by examiner

FIG. 7

| PATH LOSS [dB] | TRANSMISSION LEVEL [dBm] |
|---|---|
| PL<a | A |
| a≦PL<b | B |
| b≦PL<c | C |
| .. | .. |

| RECEPTION LEVEL [dBm] | TRANSMISSION LEVEL [dBm] |
|---|---|
| PR<a | A |
| a≦PR<b | B |
| b≦PR<c | C |
| .. | .. |

500

RADIO BASE STATION AND NETWORK DEVICE

TECHNICAL FIELD

The present invention relates to a radio base station and a network device.

BACKGROUND ART

For a mobile communication system, a network administrator has to perform cumbersome design and evaluation works such as the followings in order to meet demanded quality of service for communication which occurs at a mobile station at random. Specifically, before building a macro cell radio base station, the network administrator needs to estimate a service area and traffic thereof and design on the desk operation parameters including an installation location, a configuration, a transmission level of a common control signal and the like by simulation or the like. Then, after building the macro cell radio base station, the network administrator needs to periodically perform actual measurement/ checking and maintenance of the service area, quality of service, system capacity and the like.

Nowadays, studies are made on an operation method for a radio base station installed in a small-size area such as a home, called a femto cell radio base station (Home eNB).

However, since the femto cell radio base station can be installed flexibly in a small-size area such as a home, an extremely larger number of femto cell radio base stations are expected to be installed than the number of the macro cell radio base stations, whereby a tremendous workload will be spent for the design and evaluation works mentioned above.

Moreover, in an area crowded with households such as an apartment building or the like, the femto cell radio base stations are expected to be installed in a crowded state as well, whereby the design and evaluation mentioned above will be so complicated.

In order to solve such problems, a method for reducing workloads needed for the design and evaluation mentioned above is known, in which the femto cell radio base station measures a reception level of the common control signal transmitted from a neighboring cell and automatically controls a transmission level of the common control signal thereof based on the reception level.

SUMMARY OF THE INVENTION

Problems to be Solved by the Invention

However, in a situation where the femto cell radio base stations are located closely adjacent to each other, when the transmission level of the common control signal is controlled by such a method based on the reception level of the common control signal transmitted from an adjacent femto cell radio base station, both of the femto cell radio base stations work to mutually enhance the transmission levels of the common control signals, which may cause each of the femto cell radio base stations to significantly interfere with the service area of the other femto cell radio base station.

The present invention has been made in view of the above problem. An objective of the present invention is to provide a radio base station and a network device which are capable of automatically setting the transmission level of the common control signal of the radio base station while suppressing the interference with neighboring cells.

Means for Solving the Problems

The first feature of the present invention is summarized in that a radio base station including: a common control signal reception unit configured to receive a common control signal transmitted from each neighboring cell; a measurement unit configured to measure a reception level of the received common control signal; a recognition unit configured to recognize a transmission level of the common control signal at the neighboring cell and a type of the neighboring cell based on the received common control signal; a transmission level determination unit configured to determine a transmission level of a common control signal based on the reception level of the common control signal, the transmission level of the common control signal at the neighboring cell and the type of the neighboring cell; and a common control signal transmission unit configured to transmit the common control signal at the transmission level determined by the transmission level determination unit.

The second feature of the present invention is summarized in that a network device responsible for control of a radio base station, including: a transmission level determination unit configured to determine a transmission level of a common control signal at the radio base station based on a reception level of a common control signal transmitted from each neighboring cell of the radio base station, a transmission level of the common control signal at the neighboring cell, and a type of the neighboring cell; and a notification unit configured to notify the radio base station of the transmission level determined by the transmission level determination unit.

Advantageous Effects of the Invention

As described above, the present invention provides a radio base station and a network device capable of automatically setting the transmission level of the common control signal at the radio base station while suppressing the interference with neighboring cells.

BRIEF DESCRIPTION OF THE DRAWINGS

FIG. 7 is a diagram showing an example of a table used in determining the transmission level of common control information in the femto cell radio base station according to the first embodiment of the present invention.

FIG. 8 is a diagram showing an example of a table used in determining the transmission level of the common control information in the femto cell radio base station according to the first embodiment of the present invention.

MODES FOR CARRYING OUT THE INVENTION

Configuration of a Mobile Communication System according to a First Embodiment of the Present Invention A configuration of a mobile communication system according to a first embodiment of the present invention is described with reference to FIG. 1 and FIG. 2.

Figure 1:
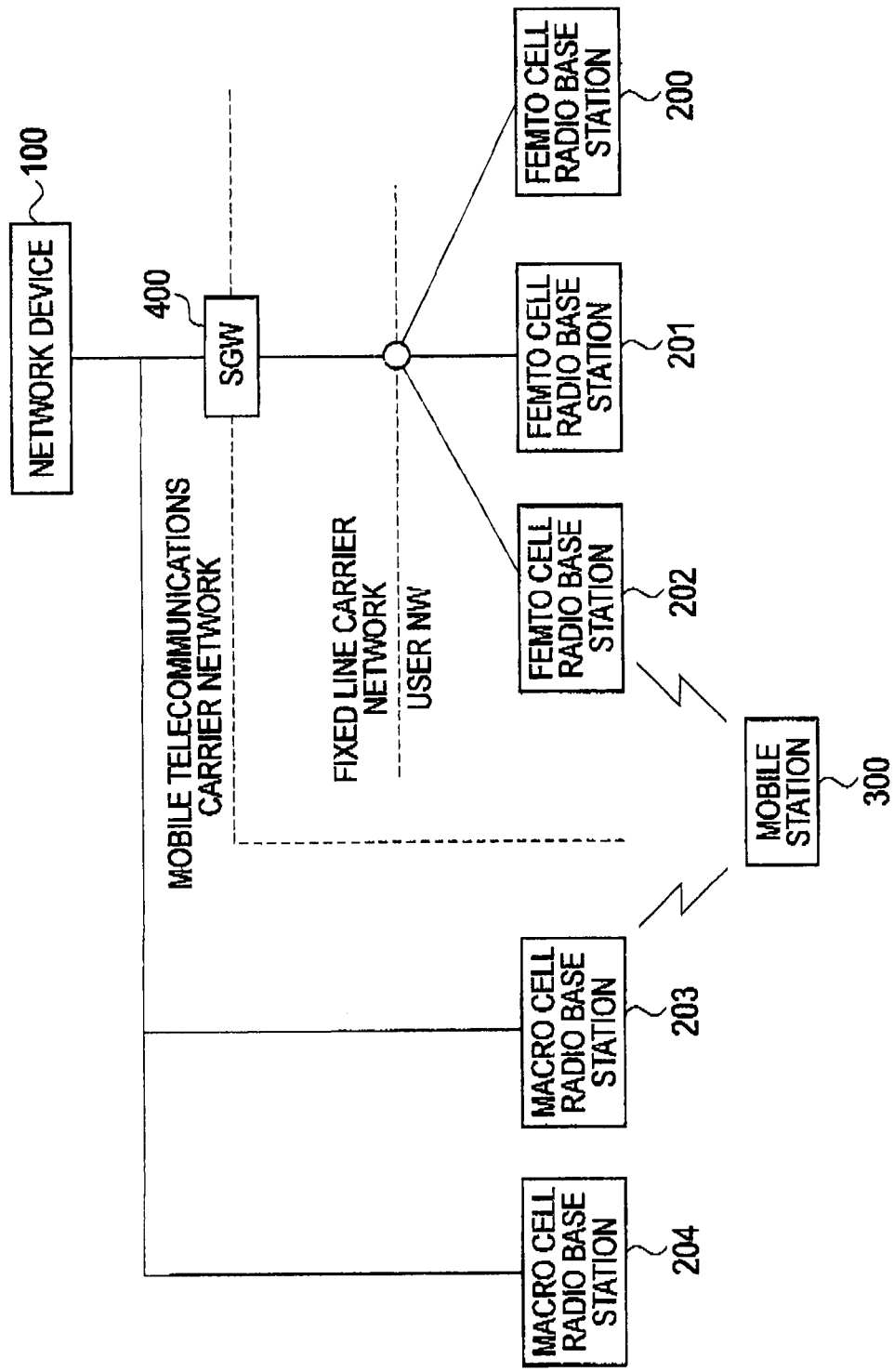
FIG. 1 is an overall configuration view of a mobile communication system according to a first embodiment of the present invention.

As shown in FIG. 1, the mobile communication system according to this embodiment includes a network device 100, a gateway device (SGW: Security Gateway) 400, femto cell radio base stations 200 to 202 and macro cell radio base stations 203, 204.

The femto cell radio base stations 200 to 202 and the macro cell radio base stations 203, 204 are under control of the network device 100.

The network device 100 is configured to assign and manage dedicated radio channels between the femto cell radio base stations 200 to 202 as well as the macro cell radio base stations 203, 204 and a mobile station 300 communicating therewith, with respect to the femto cell radio base stations 200 to 202 and the macro cell radio base stations 203, 204.

For example, when the mobile communication system according to this embodiment is a W-CDMA mobile communication system, the network device 100 includes a radio network controller RNC, whereas when the mobile communication system according to this embodiment is a LTE (Long Term Evolution) mobile communication system, the network device 100 includes a switching center MME or SGSM. Further, the network device 100 may be constructed by other devices.

The macro cell radio base stations 203, 204 are first radio base stations provided within a mobile telecommunications carrier network managed by a mobile telecommunications carrier, and the femto cell radio base stations 200 to 202 are second radio base stations provided in a user network (a network managed by a subscriber of a mobile telecommunications carrier) which is different from the mobile telecommunications carrier network.

For example, the femto cell radio base stations 200 to 202 are provided in a LAN (Local Area Network) managed by the subscriber mentioned above and are connected to the network device 100 provided on a mobile telecommunications carrier network via an access line provider network (fixed line carrier network) including FTTH (Fiber To The Home), ADSL (Asymmetric Digital Subscriber Line), and the like.

On a boundary of the mobile telecommunications carrier network, the gateway device 400 is provided. The gateway device 400 protects the mobile telecommunications carrier network from unauthorized accesses from other networks so that only accesses authorized through authentication processing of the gateway device 400 are permitted to the mobile telecommunications carrier network.

Hereinafter, configurations of the femto cell radio base stations 200 to 202 are described with reference to FIG. 2. Since configurations of the femto cell radio base stations 200 to 202 are basically the same as each other, a configuration of the femto cell radio base station 200 is described as a representative femto cell radio base station.

Figure 2:
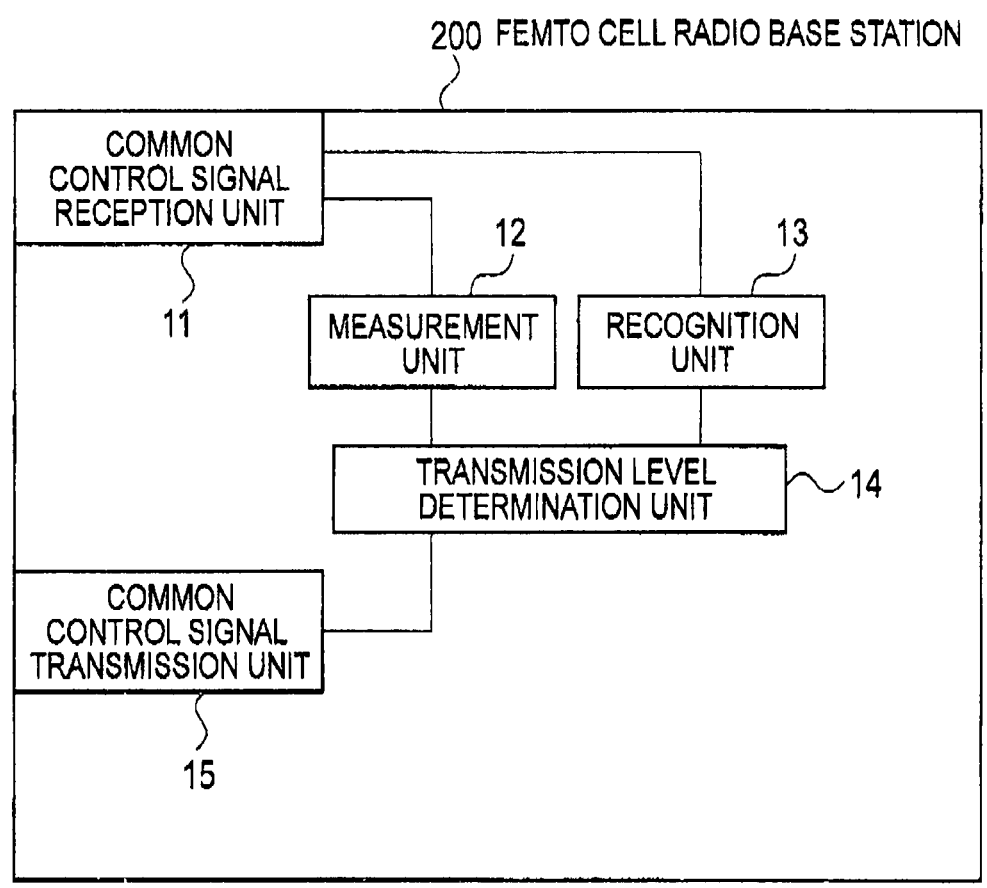
FIG. 2 is a functional block diagram of a femto cell radio base station according to the first embodiment of the present invention.

As shown in FIG. 2, the femto cell radio base station 200 includes a common control signal reception unit 11, a measurement unit 12, a recognition unit 13, a transmission level determination unit 14 and a common control signal transmission unit 15.

The common control signal reception unit 11 is configured to receive common control signals transmitted from neighboring cells.

The measuring unit 12 is configured to measure reception levels of the received common control signals.

The recognition unit 13 is configured to recognize transmission levels of the common control signals at neighboring cells and types of the neighboring cells based on the received common control signals.

Here, the type of the neighboring cell includes "Macro cell (first cell)" whose transmission level of the common control signal is not modified, and "Femto cell (second cell)" whose transmission level of the common control signal is modified.

That is, the mobile communication system according to this embodiment is configured such that the transmission level of the common control signal is not modified in the macro cells under the control of the macro cell radio base stations 203, 204, but modified in a femto cell under the control of the femto cell radio base stations 200 to 202.

For example, the recognition unit 13 may be configured to recognize the type of the neighboring cell according to cell type identification information included in the common control signal. Here, the cell type identification information is information for identifying a transmission source cell of the common control signal, which may be contained in a frame for transmitting the common control signal and may be used in masking the common control signal.

Further, the recognition unit 13 may be configured to recognize as "Macro cell (first cell)" the type of a neighboring cell having a transmission level of the recognized common control signal is larger than the first threshold value, and recognize as "Femto cell (second cell)" the type of a neighboring cell having a transmission level of the recognized common control signal is equal to or smaller than the first threshold value.

The transmission level determination unit 14 is configured to determine a transmission level of the common control signal at the femto cell radio base station 200 based on the reception level of the common control signal, the transmission level of the common control signal at a neighboring cell and the type of the neighboring cell.

Specifically, the transmission level determination unit 14 may be configured such that when it determines that at least one "Macro cell (first cell)" exists as a neighboring cell, the transmission level of the common control signal is determined based on the total sum of the reception levels of the common control signals measured by the measurement unit 12.

Further, the transmission level determination unit 14 may be configured such that when it determines that all neighboring cells are determined as "Femto cells (second cells)," the transmission level of the common control signal is determined based on the path loss between neighboring cells and the radio base station calculated based on the reception levels of the common control signals measured by the measurement unit 12 and the transmission levels of the common control signals in neighboring cells recognized by the recognition unit 13.

Further, the transmission level determination unit 14 may be configured to periodically determine the transmission level of the common control signal.

The common control signal transmission unit 15 is configured to transmit the common control signal at the transmission level determined by the transmission level determination unit 14.

Further, the transmission level determination unit 14 may be configured to determine the transmission level of the common control signal based on the total sum of the reception levels of the common control signals, if a predetermined time period has passed in the condition that the total sum of the reception levels of the common control signals measured by the measurement unit 12 remains higher than the second threshold value after the common control signal transmission unit 15 has transmitted the common control signal at the transmission level determined by the transmission level determination unit 14 based on the path loss.

Further, the common control signal transmission unit 15 may be configured to transmit the common control signal at the transmission level determined by the transmission level determination unit 14 after transmitting the common control signal at the maximum transmission level available at the femto cell radio base station for a predetermined period of time.

Operations of Mobile Communication System according to the First Embodiment of the Present Invention Operations of a mobile communication system according to the first embodiment of the present invention, more specifically, operations of the mobile communication system with a femto cell radio base station 200 newly provided therein during operations of the femto cell radio base stations 201, 202 and the macro cell radio base stations 203, 204, are described with reference to FIGS. 3 to 9.

Figure 3:
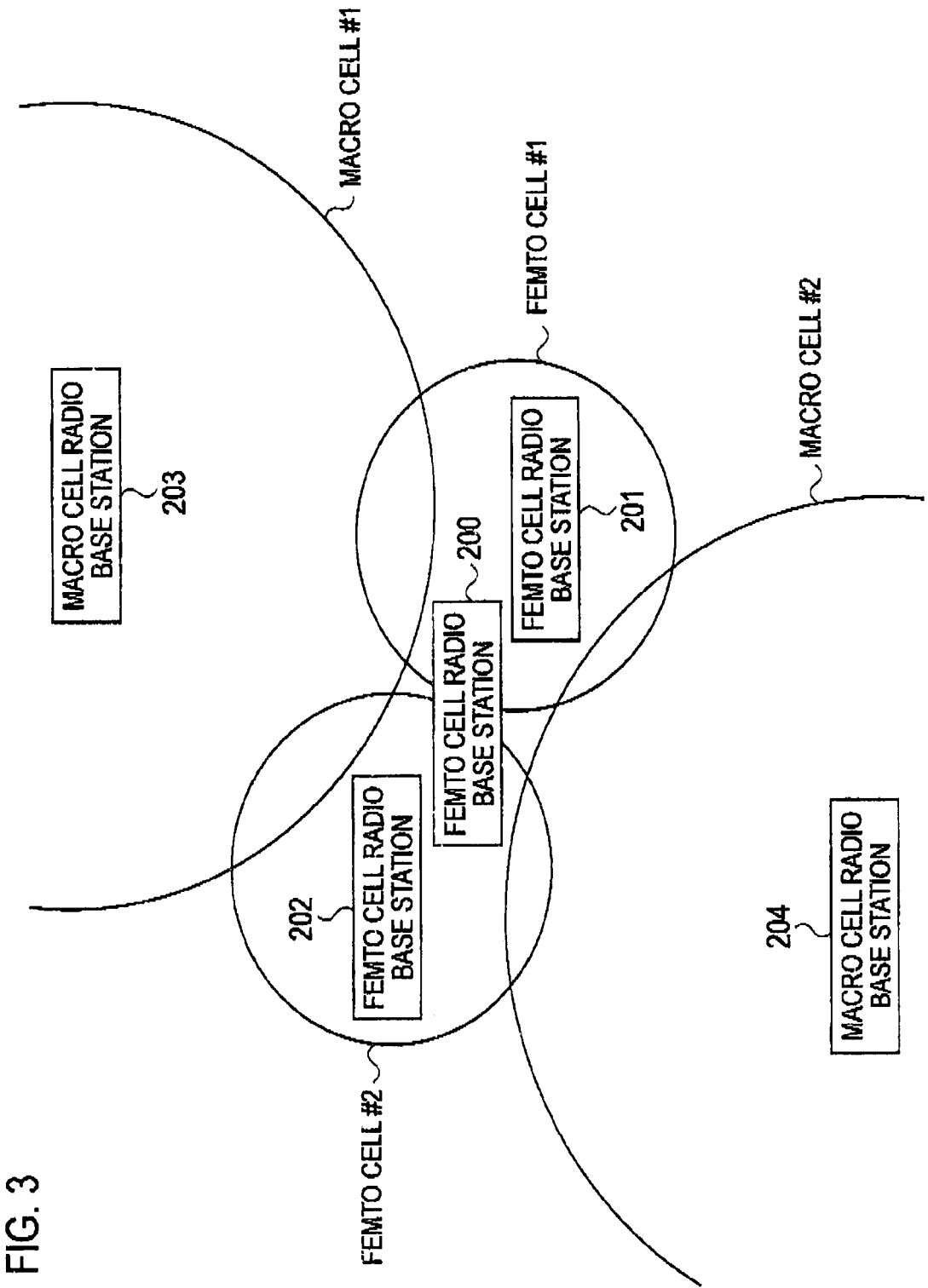
FIG. 3 is a diagram showing an example of arrangements of femto cell radio base stations and macro cell radio base stations in the mobile communication system according to the first embodiment of the present invention.
Figure 4:
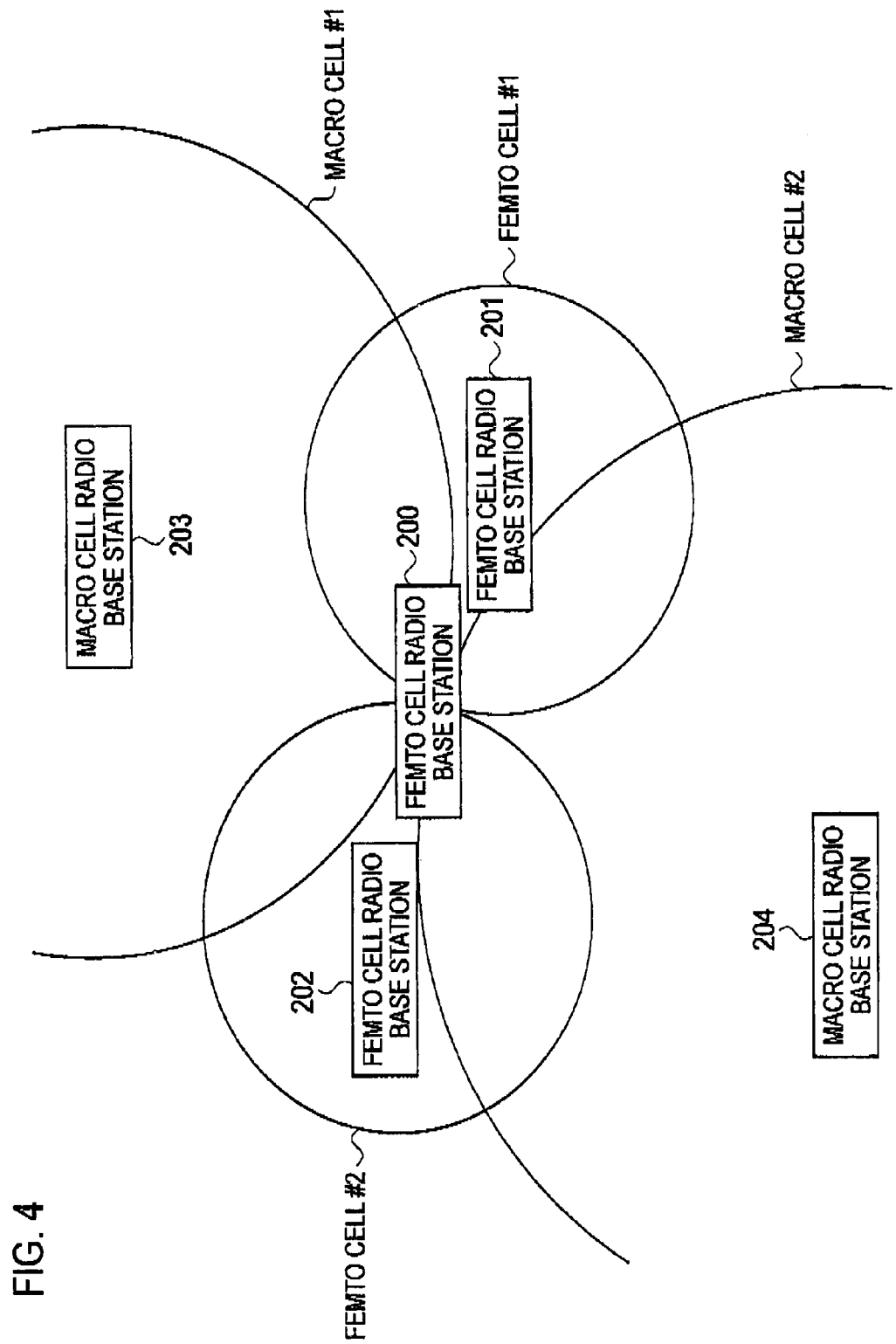
FIG. 4 is a diagram showing an example of arrangements of the femto cell radio base stations and the macro cell radio base stations in the mobile communication system according to the first embodiment of the present invention.
Figure 5:
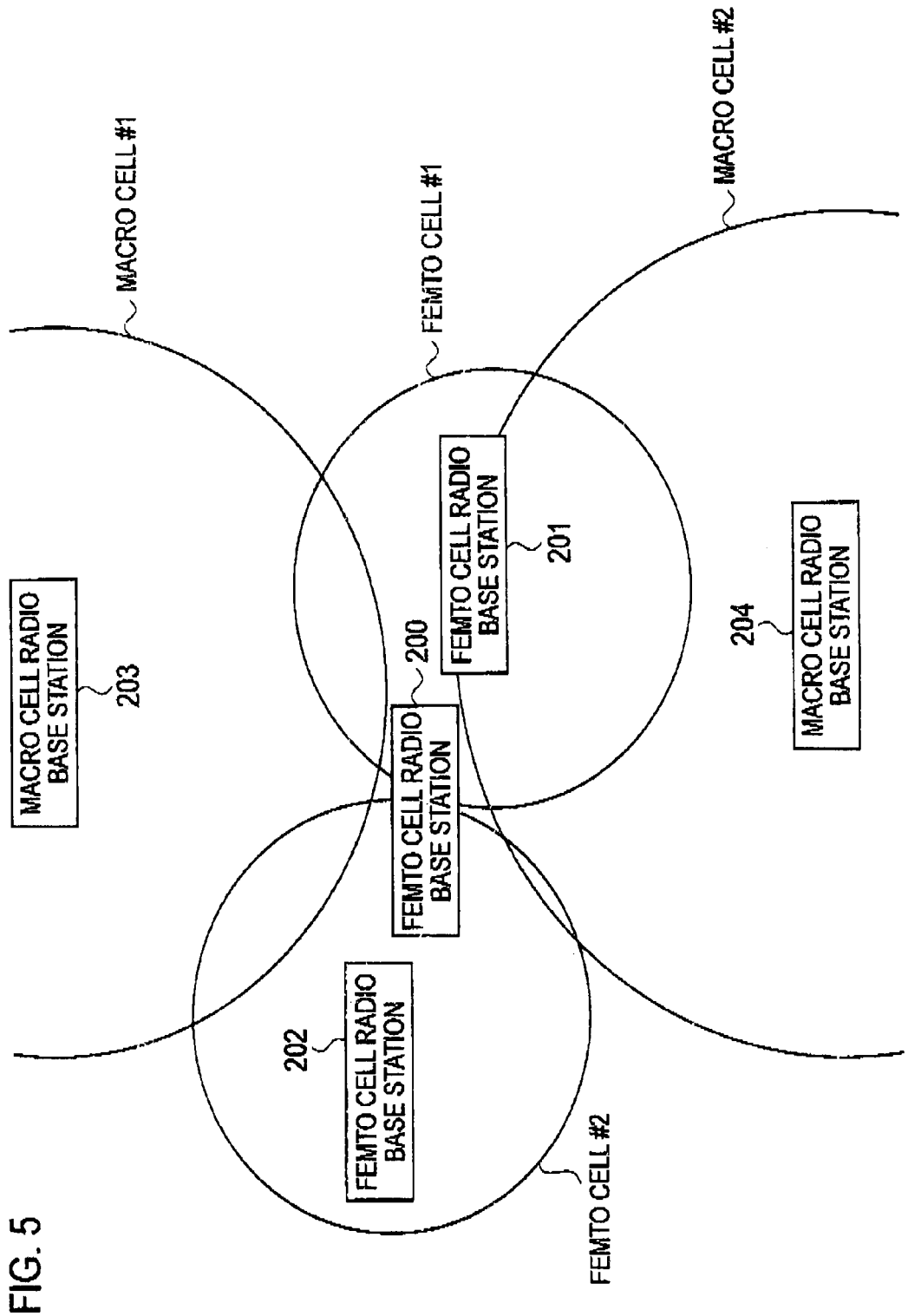
FIG. 5 is a diagram showing an example of arrangements of the femto cell radio base stations and the macro cell radio base stations in the mobile communication system according to the first embodiment of the present invention.

As shown in FIGS. 3 to 5, three cases of adjacence situations of macro cells #1, #2 and femto cells #1, #2 are assumed. For the respective cases, operations of controlling the femto cell under the control of the femto cell radio base station 200 are described with reference to the flow charts.

Here, FIG. 3 corresponds to Case 1, FIG. 4 to Case 2, and FIG. 5 to Case 3. Further, it is assumed that the macro cell radio base stations 203, 204 are radio base stations which provide a public communication service, and that service areas (macro cells #1, #2) thereof are fixedly provided.

Figure 6:
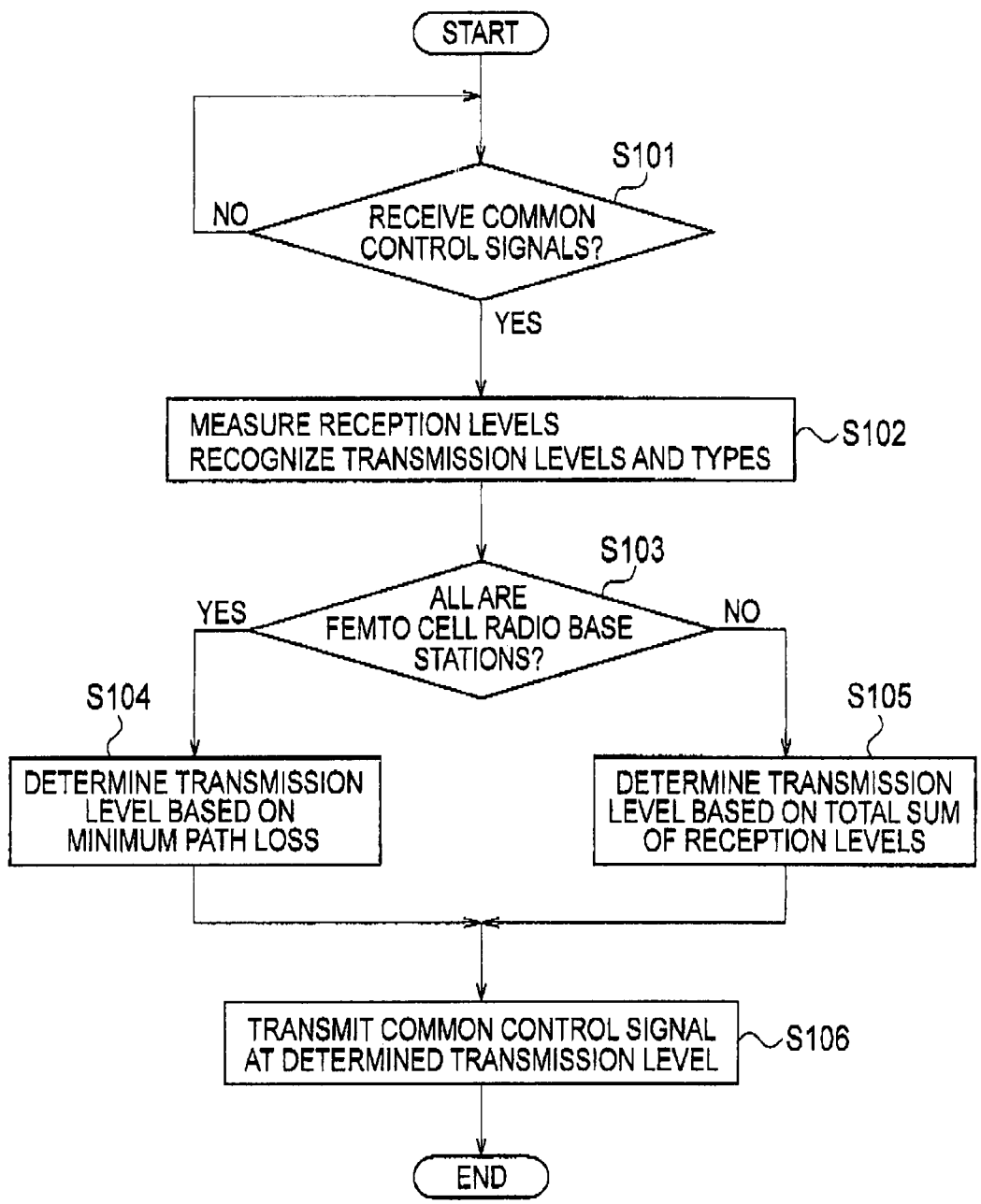
FIG. 6 is a flow chart showing operations of a femto cell radio base station according to the first embodiment of the present invention.

As shown in FIG. 6, a newly provided femto cell radio base station 200 attempts to receive the common control signals transmitted from neighboring cells (neighboring radio base stations) in Step S101.

If the common control signals are received successfully, the operation proceeds to Step S102. If the common control signals are not received successfully, the operation repeats Step S101.

In Case 1 shown in FIG. 3 and Case 3 shown in FIG. 5, the femto cell radio base station 200 can receive the common control signals transmitted by the femto cell radio base stations 201, 202 (femto cells #1, #2).

Moreover, in Case 2 shown in FIG. 4, the femto cell radio base station 200 can receive the common control signals transmitted by the femto cell radio base stations 201, 202 (femto cells #1, #2) and the macro cell radio base stations 203, 204 (macro cells #1, #2).

In Step S102, the femto cell radio base station 200 measures the reception levels of the received common control signals. Here, the reception level of the common control signal transmitted from the femto cell radio base station (femto cell #1) is "PR201," the reception level of the common control signal transmitted from the femto cell radio base station 202 (femto cell #2) is "PR202," the reception level of the common control signal transmitted from the macro cell radio base station 203 (macro cell #1) is "PR203," and the reception level of the common control signal transmitted from the macro cell radio base station 204 (macro cell #2) is "PR204."

Further, the common control signal described above contains transmission levels "PT201" to "PT204" of the common control signals at radio base stations 201 to 204 (femto cells #1, #2 and macro cells #1, #2) and identification information for identifying the types of the neighboring cells (for example, femto cell or macro cell).

Here, the femto cell radio base station 200 decodes the received common control signals to recognize the transmission levels ("PT201" to "PT204") of the common control signals in the radio base stations 201 to 204 (femto cells #1, #2 and macro cells #1, #2) and the types of the radio base stations 201 to 204 (femto cells #1, #2 and macro cells #1, #2).

The femto cell radio base station 200 recognizes "PT201," "PT202" and "a fact that the radio base stations 201, 202 are the femto cell radio base stations" in Case 1 and Case 3, and recognizes "PT201" to "PT204," "that the radio base stations 201, 202 are the femto cell radio base stations" and "that the radio base stations 203, 204 are the macro cell radio base stations" in Case 2.

In Step S103, the femto cell radio base station 200 determines whether or not all neighboring cells (neighboring radio base stations) which have received the common control signals are the femto cells (femto cell radio base stations).

When all neighboring cells (neighboring radio base stations) are determined as the femto cells (femto cell radio base stations), the operation proceeds to Step S104. Otherwise, the operation proceeds to Step S105.

In Step S104, the femto cell radio base station 200 calculates the path loss for each of neighboring cells (neighboring femto cell radio base stations) to determine the minimum value thereof.

The path loss is calculated by subtracting the reception level of the common control signal at the femto cell radio base station 200 from the transmission level of the common control signal transmitted from the neighboring cell (neighboring femto cell radio base station).

The total sum of the reception levels of the common control signals is, in Case 1 and Case 3, the sum of the reception levels of the common control signals transmitted by femto cell radio base stations 201, 202 (femto cells #1, #2) ("PR201"+ "PR202"), and, in Case 2, the sum of the reception levels of the common control signals transmitted by the femto cell radio base stations 201, 202 (femto cells #1, #2) and the macro cell radio base stations 203, 204 (macro cells #1, #2) ("PR201"+"PR202"+"PR203"+"PR204").

In Case 1 to Case 3, the path loss at the femto cell radio base station 201 (femto cell #1) is "PL201"="PT201"−"PR201," and the path loss at the femto cell radio base station 202

(femto cell #2) is "PL202"="PT202"–"PR202." Here, it is assumed that "PL201"<"PL202."

Then, the femto cell radio base station 200 determines the transmission level of the common control signal at the femto cell radio base station 200 based on the minimum value of the calculated path losses.

Here, in Case 1 and Case 3, since all of the neighboring cells (neighboring radio base stations) are femto cells #1, #2 (femto cell radio base stations 201, 202), the femto radio base station 200 determines the transmission level of the common control signal at the femto radio base station 200 (femto cell under control thereof) based on the minimum path loss "PL201."

For example, the femto cell radio base station 200 holds in advance a correspondence table 600 associating "path loss (dB)" and "transmission level of common control signal (dBm)" with each other as shown in FIG. 7, and determines the transmission level corresponding to the minimum value of the calculated path losses as the transmission level of the common control signal at the femto cell radio base station 200 (femto cell under control thereof).

Set-up values of the correspondence table 600 are determined from SIR (Signal-to-Interference Ratio) or the like required for communication of a mobile station 300 in the mobile communication system.

In Step S105, the femto cell radio base station 200 calculates the total sum of the reception levels of the common control signals transmitted from all neighboring cells (neighboring radio base stations), and determines the transmission level of the common control signal at the femto cell radio base station 200 based on the total sum of the calculated reception levels of the common control signals.

Here, in Case 2, since neighboring cells (neighboring radio base stations) include the macro cells (macro cell radio base stations 203, 204), the femto cell radio base station 200 determines the transmission level of the common control signal at the femto cell radio base station 200 based on the total sum of the reception levels of the common control signals transmitted from all neighboring cells (neighboring radio base stations).

For example, the femto cell radio base station 200 holds in advance a correspondence table 500 associating "reception level of common control signal (dBm)" and "transmission level of common control signal (dam)" with each other as shown in FIG. 8, and determines the transmission level corresponding to the total sum of the calculated reception levels as the transmission level of the common control signal at the femto cell radio base station 200 (femto cell under control thereof).

Set-up values in the correspondence table 500 are determined from SIR required for communication of a mobile station 300 in the mobile communication system, the area radius needed to the femto cell, a spatial path loss, a house intrusion loss, and the like.

In Step S106, the femto cell radio base station 200 transmits the common control signal at a determined transmission level.

Further, the femto cell radio base station 200 transmits the common control signal to the neighboring femto cell radio base stations 201, 202 at the maximum available transmission level just for a predetermined period of time in order to announce the existence thereof.

Such operations enable the femto cell radio base stations 201, 202 to receive the common control signal from the femto cell radio base station 200 for a predetermined period of time to measure a path loss between the femto cell radio base stations 201, 202 and the femto cell radio base station 200.

However, when the macro cell radio base station is located adjacent to neighboring cells (neighboring radio base stations) even if neighboring cells (neighboring radio base stations) are femto cells (femto cell radio base stations) only (Case 3 shown in FIG. 5), the neighboring femto cell radio base stations 201, 202 control the transmission level of the common control signal based on the total sum of the reception levels of the common control signals so as to secure required SIR in the femto cells #1, #2 under control of the femto cell radio base stations 201, 202, whereby there may be a case where the transmission level of the common control signal cannot be controlled to avoid interference of the femto cell radio base stations 201, 202 with the femto cell radio base station 200.

Hereinafter, operations of Case 3 after start-up of the femto cell radio base station 200 are described with reference to FIG. 9.

In Case 3, the neighboring radio base stations of the femto cell radio base station 200 are the femto cell radio base stations 201, 202 as shown in FIG. 5. In other words, all are the femto cell radio base stations. However, the femto cell radio base station 201 has the macro cell radio base station 204 as the neighboring radio base station. Even when the femto cell radio base station 200 starts to operate by determining the transmission level based on the path loss described above in consideration that all of the neighboring radio base stations are femto cell radio base stations, the femto cell radio base station 201 continues to operate by determining the transmission level based on the total sum of the reception levels of the common control signals transmitted from the femto cell radio base station 200 and the macro cell radio base station 204.

In such case, when the femto cell radio base station 200 continues to operate by determining the transmission level based on a path loss (minimum path loss) between itself and the femto cell radio base station 201, a service area for the femto cell radio base station 200 may not be secured.

Therefore, according to this embodiment, the femto cell radio base station 200 autonomously determines as described below that the transmission levels of the common control signals at the neighboring radio base stations is not shared (transmission level of the common control signal is not determined in consideration of the path loss between the femto cell radio base station 200 and the neighboring femto cell radio base station 201) and updates the transmission level during operations.

Figure 9:
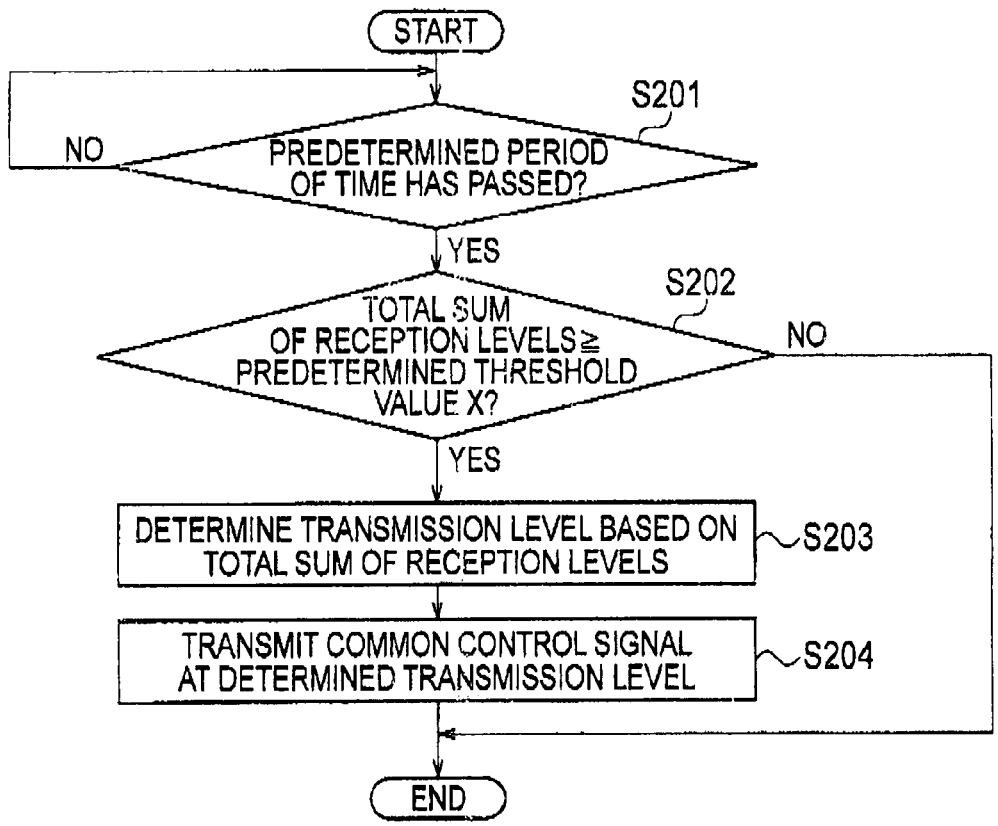
FIG. 9 is a flow chart showing operations of the femto cell radio base station according to the first embodiment of the present invention.

As shown in FIG. 9, in Step S201, the femto cell radio base station 200 determines whether or not a predetermined period of time has passed since transmission of the common control signal at the transmission level determined on the path loss described above started.

If the femto cell radio base station 200 determines that the predetermined period of time has passed, the operation proceeds to Step S202, whereas if it is determined that the predetermined period of time has not passed, the operation repeats Step S201.

In Step S202, the femto cell radio base station 200 determines whether or not the total sum of the reception levels of the common control signals transmitted from all neighboring cells (neighboring radio base stations) is equal to or larger than a predetermined threshold value X.

If it is determined that the total sum of the reception levels of the common control signals is equal to or larger than the predetermined threshold value X, the operation proceeds to Step S203. Otherwise, the operation ends.

In Step S203, the femto cell radio base station 200 again determines the transmission level of the common control signal based on the total sum of the reception levels of the common control signals transmitted from all neighboring cells (neighboring radio base stations).

In Step S204, the femto cell radio base station 200 starts transmission of the common control signal at the determined transmission level.

Further, the femto cell radio base station 200 may calculate the predetermined threshold value X described above according to the total sum of the reception levels estimated on the basis of the total number of the neighboring radio base stations and the transmission level determined based on the path loss with reference to the correspondence table 600 shown in FIG. 7.

Further, the femto cell radio base station 200 may periodically perform determination of the transmission level shown in FIG. 6 after the start-up of the operations thereof.

If, like in previous calculation of the transmission level, the common control signal cannot be received, the femto cell radio base station 200 continues operation thereof without modifying the transmission level. However, the femto cell radio base station 200 attempts to receive the common control signals again at a next periodical timing.

Advantageous Effects of the Mobile Communication System according to the First Embodiment of the Present Invention In a mobile communication system according to the first embodiment of the present invention, the femto cell radio base station includes a function to automatically control the transmission level of the common control signal. In consideration that the macro cell radio base station-fixedly establishes the transmission level of the common control signal, if the macro cell (macro cell radio base station) is included in neighboring cells (neighboring radio base stations), the femto cell radio base station automatically controls the transmission level of the common control signal so as to secure a required SIR in a service area needed therefor with the first priority. If neighboring cells (neighboring radio base stations) are femto cells (femto cell radio base stations) only, interference between the neighboring cells (neighboring radio base stations) can be avoided by mutually performing the function to automatically control the transmission level of the common control signal.

Modified Example 1

A mobile communication system according to a modified example 1 of the present invention is described with reference to FIG. 10.

Although the first embodiment described above assumes that the femto cell radio base station 200 autonomously controls the transmission level of the common control signal, the network device 100 is configured to determine the transmission level of the common control signal at the femto cell radio base station 200.

Figure 10:
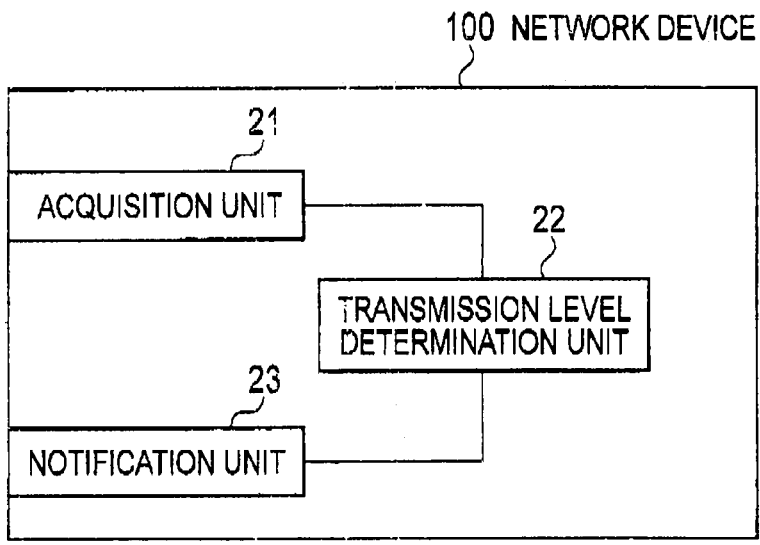
FIG. 10 is a functional block diagram of a network device according to a modified embodiment 1 of the present invention.

As shown in FIG. 10, the network device 100 responsible for control of the femto cell radio base station 200 includes an acquisition unit 21, a transmission level determination unit 22, and a notification unit 23.

The acquisition unit 21 is configured to acquire, from the femto cell radio base station 200, information including reception and transmission levels of the common control signals transmitted from neighboring cells (neighboring radio base stations) of the femto cell radio base station 200, the type of the neighboring cell, the path loss for the neighboring cell (neighboring radio base station), and the like.

The transmission level determination unit 22 is configured to determine the transmission level of the common control signal at the femto cell radio base station 200 based on the information acquired by the acquisition unit 21.

Specifically, the transmission level determination unit 22 may be configured such that when determining that at least one macro cell (first cell) exists as a neighboring cell of the femto cell radio base station 200, the transmission level of the common control signal at the femto cell radio base station 200 is determined based on the total sum of the reception levels of the common control signals at the femto cell radio base station 200.

Further, the transmission level determination unit 22 may be configured such that when determining that all neighboring cells of the femto cell radio base station 200 are femto cells (second cells), the transmission level of the common control signal at the femto cell radio base station 200 is determined based on the path loss between neighboring cells and the femto cell radio base station 200 calculated based on the reception levels of the common control signals at the femto cell radio base station 200 and the transmission levels of the common control signals at neighboring cells of the femto cell radio base station 200.

The transmission level determination unit 22 may be configured such that if a predetermined period of time has passed in the condition that the total sum of the reception levels of the common control signals at the femto cell radio base station 200 is larger than the second threshold value after the femto cell radio base station 200 transmitted the common control signal at the transmission level determined by the transmission level determination unit 22 based on the path loss, the transmission level of the common control signal at the femto cell radio base station 200 is determined based on the total sum of the reception levels of the common control signals transmitted from neighboring cells of the femto cell radio base station 200.

The transmission level determination unit 22 may be configured to periodically determine the transmission level of the common control signal at the femto cell radio base station 200.

The notification unit 23 is configured to notify the transmission level determined by the transmission level determination unit 22 to the femto cell radio base station 200.

Modified Example 2

Accommodating elements of the macro cell radio base stations 203, 204 and the femto cell radio base stations 200, 201, 202 in a mobile communication system according to a modified example 2 of this embodiment are described with reference to FIG. 11.

Here, it is assumed that a mobile communication system according to the modified example 2 of this embodiment is a WCDMA mobile communication system.

Figure 11:
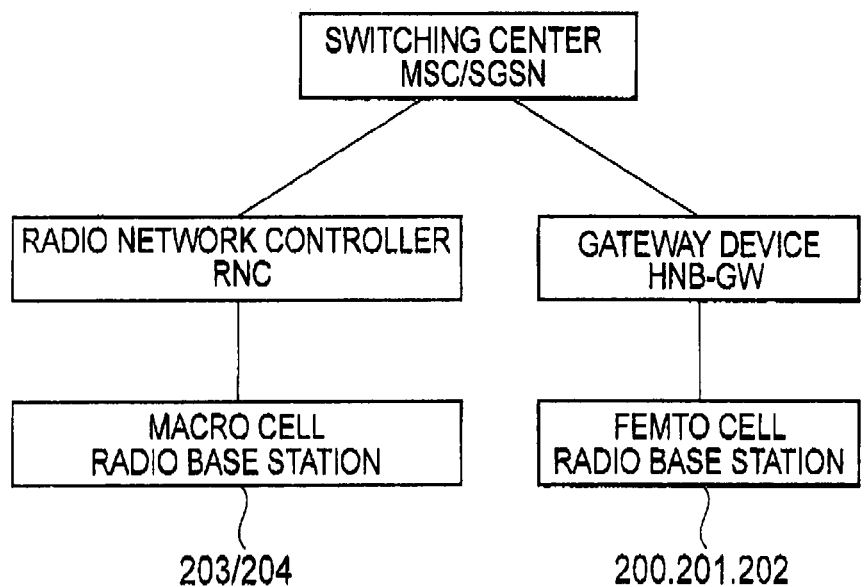
FIG. 11 is an overall configuration view of a mobile communication system according to a modified embodiment 2 of the present invention.

As shown in FIG. 11, the mobile communication system according to the modified example 2 of this embodiment is configured such that an accommodating element of the macro cell radio base stations 203, 204 is a radio network controller RNC, which is a kind of the network device, and an accommodating element of the femto cell radio base stations 200, 201, 202 is a concentrator HNB-GW, which is a kind of the network device.

Here, the accommodating element of the femto cell radio base stations 200, 201, 202 may be the radio network controller RNC instead of the concentrator HNB-GW.

Modified Example 3

Accommodating elements of the macro cell radio base stations 203, 204 and the femto cell radio base stations 200, 201, 202 in a mobile communication system according to a modified example 3 of this embodiment are described with reference to FIG. 12.

Here, it is assumed that a mobile communication system according to the modified example 3 of this embodiment is a LTE mobile communication system.

Figure 12:
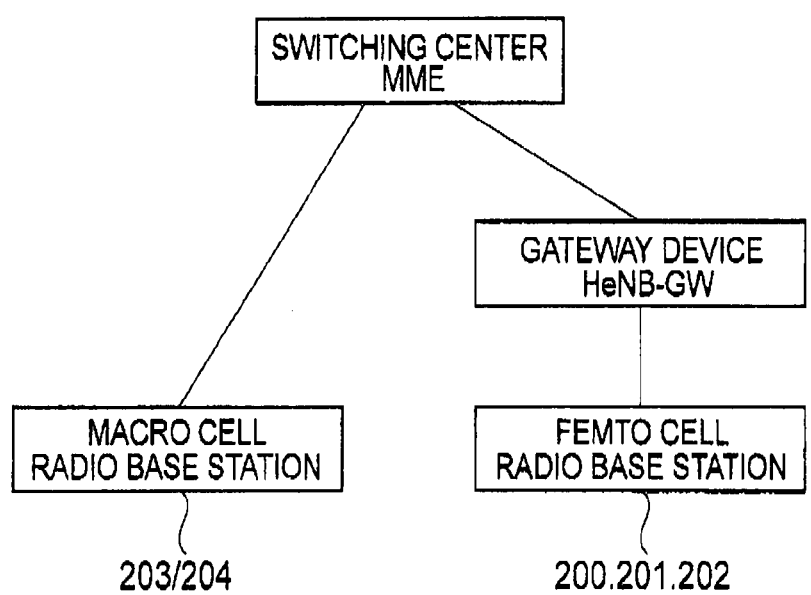
FIG. 12 is an overall configuration view of a mobile communication system according to a modified embodiment 3 of the present invention.

As shown in FIG. 12, the mobile communication system according to the modified example 3 of this embodiment is configured such that an accommodating element of the macro cell radio base stations 203, 204 is a switching center MME, which is a kind of the network device, and an accommodating element of the femto cell radio base stations 200, 201, 202 is a concentrator HeNB-GW, which is a kind of the network device.

Here, the accommodating element of the femto cell radio base stations 200, 201, 202 may be the switching center MME instead of the concentrator HeNB-GW.

Modified Example 4

Accommodating elements of the macro cell radio base stations 203, 204 and the femto cell radio base stations 200, 201, 202 in a mobile communication system according to a modified example 4 of this embodiment are described with reference to FIG. 13.

Here, it is assumed that a mobile communication system according to the modified example 4 of this embodiment may be a LTE mobile communication system or a WCDMA mobile communication system.

Figure 13:
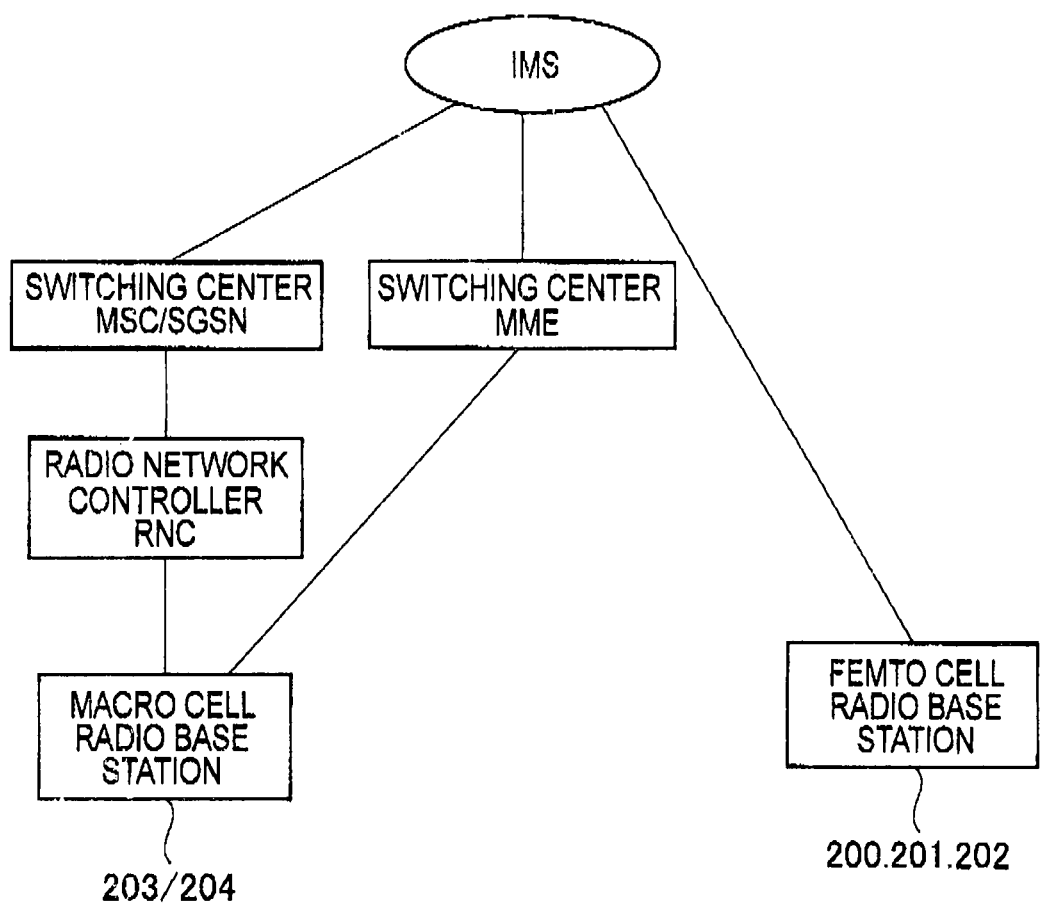
FIG. 13 is an overall configuration view of a mobile communication system according to a modified embodiment 4 of the present invention.

As shown in FIG. 13, the mobile communication system according to the modified example 4 of this embodiment is configured such that an accommodating element of the macro cell radio base stations 203, 204 is a switching center MME or a radio network controller RNC, which is a kind of the network device, and an accommodating element of the femto cell radio base stations 200, 201, 202 is an IMS (IP Multimedia Subsystem) which is a kind of the network device.

Aspects of this embodiment described above may be described as follows.

A first aspect of this embodiment is summarized in that a radio base station includes: a common control signal reception unit 11 configured to receive a common control signal transmitted from each neighboring cell; a measurement unit 12 configured to measure a reception level of the received common control signal; a recognition unit 13 configured to recognize a transmission level of the common control signal at the neighboring cell and a type of the neighboring cell based on the received common control signal; a transmission level determination unit 14 configured to determine a transmission level of a common control signal based on the reception level of the common control signal, the transmission level of the common control signal at the neighboring cell and the type of the neighboring cell; and a common control signal transmission unit 15 configured to transmit the common control signal at the transmission level determined by the transmission level determination unit 14.

In the first aspect of this embodiment, the type of the neighboring cell may include a first cell (macro cell) whose transmission level of the common control signal is not modified, and a second cell (femto cell) whose transmission level of the common control signal is modified.

In the first aspect of this embodiment, the recognition unit 13 may be configured to recognize the type of the neighboring cell based on cell type identification information contained in the common control signal.

In the first aspect of this embodiment, the recognition unit 13 may be configured to recognize as the first cell the type of a neighboring cell whose recognized transmission level of the common control signal is larger than a first threshold value, and recognize as the second cell the type of a neighboring cell whose recognized transmission level of the common control signal is equal to or smaller than the first threshold value.

In the first aspect of this embodiment, the transmission level determination unit 14 may be configured to, when determining that at least one first cell exists as the neighboring cell, determine the transmission level of the common control signal based on a total sum of the reception levels of the common control signals measured by the measurement unit 12.

In the first aspect of this embodiment, the transmission level determination unit 14 may be configured to, when determining that all neighboring cells are the second cells, determine the transmission level of the common control signal based on a path loss between each of the neighboring cells and the radio base station calculated on the basis of the reception level of the common control signal measured by the measurement unit 12 and the transmission level of the common control signal at the neighboring cell recognized by the recognition unit 13.

In the first aspect of this embodiment, the transmission level determination unit 14 may be configured to determine the transmission level of the common control signal based on the total sum of the reception levels of the common control signals, when the total sum of the reception levels of the common control signals measured by the measurement unit 12 is kept larger than a second threshold value for a predetermined period of time after the common control signal transmission unit 15 transmits the common control signal at the transmission level determined based on the path loss by the transmission level determination unit 14.

In the first aspect of this embodiment, the common control signal transmission unit 15 may be configured to transmit the common control signal at the transmission level determined by the transmission level determination unit 14, after transmitting the common control signal at the maximum possible transmission level of the radio base station for a predetermined period of time.

In the first aspect of this embodiment, the transmission level determination unit 14 may be configured to periodically determine the transmission level of the common control signal.

A second aspect of this embodiment is summarized in that a network device 100 responsible for control of a radio base station may include; a transmission level determination unit 22 configured to determine a transmission level of a common control signal at the radio base station based on a reception level of a common control signal transmitted from each neighboring cell of the radio base station, a transmission level of the common control signal at the neighboring cell, and a type of the neighboring cell; and a notification unit 23 configured to notify the radio base station of the transmission level determined by the transmission level determination unit 22.

In the second aspect of this embodiment, the type of the neighboring cell may include a first cell whose transmission level of the common control signal is not modified, and a second cell whose transmission level of the common control signal is modified.

In the second aspect of this embodiment, the transmission level determination unit 22 may be configured to, when determining that at least one first cell exists as the neighboring cell, determine the transmission level of the common control signal based on a total sum of the reception levels of the common control signals.

In the second aspect of this embodiment, the transmission level determination unit 22 is configured to, when determining that all neighboring cells are the second cells, determine the transmission level of the common control signal based on a path loss between each of the neighboring cells and the radio base station calculated on the basis of the reception level of the common control signal and the transmission level of the common control signal at the neighboring cell.

In the second aspect of this embodiment, the radio base station may be configured to determine the transmission level of the common control signal based on the total sum of the reception levels of the common control signals, when the total sum of the reception levels of the common control signals at the radio base station is kept larger than a second threshold value for a predetermined period of time after the common control signal transmission unit 22 transmits the common control signal at the transmission level determined based on the path loss by the transmission level determination unit 22.

In the second aspect of this embodiment, the transmission level determination unit 22 may be configured to periodically determine the transmission level of the common control signal.

Note that operation of the above described femto-cell radio base stations 200 through 202 and the network device 100 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the femto-cell radio base station 201 or the operation apparatus 100. Also, the storage medium and the processor may be provided in femto-cell radio base stations 200 through 02 or the network device 100 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio base station comprising:
   a common control signal reception unit configured to receive a common control signal transmitted from each neighboring cell;
   a measurement unit configured to measure a reception level of the received common control signal;
   a recognition unit configured to recognize a transmission level of the common control signal at each neighboring cell and a type of the neighboring cell based on the received common control signal;
   a transmission level determination unit configured to determine a transmission level of a common control signal based on the reception level of the common control signal, the transmission level of the common control signal at each neighboring cell and the type of each neighboring cell; and
   a common control signal transmission unit configured to transmit the common control signal at the transmission level determined by the transmission level determination unit.

2. The radio base station according to claim 1, wherein the type of each neighboring cell includes a first cell whose transmission level of the common control signal is not modified, and a second cell whose transmission level of the common control signal is modified.

3. The radio base station according to claim 1, wherein the recognition unit is configured to recognize the type of each neighboring cell based on cell type identification information contained in the common control signal.

4. The radio base station according to claim 2, wherein
   the recognition unit is configured to recognize as the first cell the type of each neighboring cell whose recognized transmission level of the common control signal is larger than a first threshold value, and
   to recognize as the second cell the type of each neighboring cell whose recognized transmission level of the common control signal is equal to or smaller than the first threshold value.

5. The radio base station according to claim 2, wherein the transmission level determination unit is configured to, when determining that at least one first cell exists as each neighboring cell, determine the transmission level of the common control signal based on a total sum of the reception levels of the common control signals measured by the measurement unit.

6. The radio base station according to claim 2, wherein the transmission level determination unit is configured to, when determining that all neighboring cells are the second cells, determine the transmission level of the common control signal based on a path loss between each of the neighboring cells and the radio base station calculated on the basis of the reception level of the common control signal measured by the measurement unit and the transmission level of the common control signal at each neighboring cell recognized by the recognition unit.

7. The radio base station according to claim 6, wherein the transmission level determination unit is configured to determine the transmission level of the common control signal based on the total sum of the reception levels of the common control signals, when the total sum of the reception levels of the common control signals measured by the measurement unit is kept larger than a second threshold value for a predetermined period of time after the common control signal transmission unit transmits the common control signal at the transmission level determined based on the path loss by the transmission level determination unit.

8. The radio base station according to claim 1, wherein the common control signal transmission unit is configured to transmit the common control signal at the transmission level determined by the transmission level determination unit, after transmitting the common control signal at the maximum possible transmission level of the radio base station for a predetermined period of time.

9. The radio base station according to claim 1, wherein the transmission level determination unit is configured to periodically determine the transmission level of the common control signal.

10. A network device responsible for control of a radio base station, comprising:
   a transmission level determination unit configured to determine a transmission level of a common control signal at the radio base station based on a reception level of a common control signal transmitted from each neighboring cell of the radio base station, a transmission level of the common control signal at each neighboring cell, and a type of each neighboring cell; and a notification unit configured to notify the radio base station of the transmission level determined by the transmission level determination unit.

11. The network device according to claim 10, wherein the type of each neighboring cell includes a first cell whose transmission level of the common control signal is not modified, and a second cell whose transmission level of the common control signal is modified.

12. The network device according to claim 11, wherein the transmission level determination unit is configured to, when determining that at least one first cell exists as each neighboring cell, determine the transmission level of the common control signal based on a total sum of the reception levels of the common control signals.

13. The network device according to claim 11, wherein the transmission level determination unit is configured to, when determining that all neighboring cells are the second cells, determine the transmission level of the common control signal based on a path loss between each of the neighboring cells and the radio base station calculated on the basis of the reception level of the common control signal and the transmission level of the common control signal at each neighboring cell.

14. The network device according to claim 13, wherein the radio base station is configured to determine the transmission level of the common control signal based on the total sum of the reception levels of the common control signals, when the total sum of the reception levels of the common control signals at the radio base station is kept larger than a second threshold value for a predetermined period of time after the common control signal transmission unit transmits the common control signal at the transmission level determined based on the path loss by the transmission level determination unit.

15. The network device according to claim 10, wherein the transmission level determination unit is configured to periodically determine the transmission level of the common control signal.

* * * * *